(12) United States Patent
Shin et al.

(10) Patent No.: US 8,234,247 B2
(45) Date of Patent: Jul. 31, 2012

(54) CONTENT MANAGEMENT SYSTEM AND METHOD FOR PORTABLE DEVICE

(75) Inventors: Ho Chul Shin, Suwon-si (KR); Young Kyu Bae, Suwon-si (KR); Chul Seung Kim, Seoul (KR); Yun Je Oh, Yongin-si (KR); Joon Oo Kim, Suwon-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1028 days.

(21) Appl. No.: 11/789,281

(22) Filed: Apr. 24, 2007

(65) Prior Publication Data
US 2007/0288485 A1 Dec. 13, 2007

(30) Foreign Application Priority Data
May 18, 2006 (KR) .................. 10-2006-0044554

(51) Int. Cl.
G06F 17/30 (2006.01)
(52) U.S. Cl. ...................................... 707/634
(58) Field of Classification Search .................. 707/634
See application file for complete search history.

(56) References Cited

U.S. PATENT DOCUMENTS

| | | | | |
|---|---|---|---|---|
| 5,812,130 A * | 9/1998 | Van Huben et al. | ........... | 715/764 |
| 5,826,265 A * | 10/1998 | Van Huben et al. | ........... | 1/1 |
| 6,334,075 B1 * | 12/2001 | Mase et al. | ........... | 700/9 |
| 6,622,067 B1 * | 9/2003 | Lovelace et al. | ........... | 701/19 |
| 6,633,784 B1 * | 10/2003 | Lovelace et al. | ........... | 700/65 |
| 6,931,644 B2 * | 8/2005 | Riosa et al. | ........... | 719/318 |
| 6,952,698 B2 * | 10/2005 | Delaire et al. | ........... | 1/1 |
| 6,985,901 B1 * | 1/2006 | Sachse et al. | ........... | 1/1 |
| 7,363,330 B1 * | 4/2008 | Ellman et al. | ........... | 707/620 |
| 7,394,813 B2 * | 7/2008 | Bennett et al. | ........... | 370/394 |
| 7,542,477 B2 * | 6/2009 | Yoshizawa et al. | ........... | 370/401 |
| 7,551,606 B2 * | 6/2009 | Iwamura | ........... | 370/352 |
| 7,640,248 B2 * | 12/2009 | Nakamura | ........... | 1/1 |
| 7,664,081 B2 * | 2/2010 | Luoma et al. | ........... | 370/338 |
| 7,681,244 B2 * | 3/2010 | Morioka et al. | ........... | 726/29 |
| 7,689,510 B2 * | 3/2010 | Lamkin et al. | ........... | 705/51 |
| 7,779,097 B2 * | 8/2010 | Lamkin et al. | ........... | 709/223 |
| 7,802,024 B2 * | 9/2010 | Namai et al. | ........... | 710/14 |
| 8,001,251 B2 * | 8/2011 | Fukui et al. | ........... | 709/227 |
| 2002/0120734 A1 * | 8/2002 | Riosa et al. | ........... | 709/224 |
| 2003/0020745 A1 * | 1/2003 | Kawaguchi et al. | ........... | 345/733 |
| 2004/0068523 A1 * | 4/2004 | Keith et al. | ........... | 707/200 |
| 2004/0070678 A1 * | 4/2004 | Toyama et al. | ........... | 348/231.3 |
| 2004/0073443 A1 * | 4/2004 | Gabrick et al. | ........... | 705/1 |
| 2004/0199507 A1 * | 10/2004 | Tawa, Jr. | ........... | 707/7 |

(Continued)

FOREIGN PATENT DOCUMENTS
KR 2003-41198 5/2003
(Continued)

Primary Examiner — Mark Andrew X Radtke
(74) Attorney, Agent, or Firm — Cha & Reiter, LLC

(57) ABSTRACT

The present invention relates to a content management system and method of content management on a portable device. The content management system of the present invention includes a storage unit which stores at least one content file, a content list manager which creates a content list of contents files satisfying at least one monitoring condition and manages the content list on the basis of events occurring in the storage unit, and a monitoring unit which monitors the events occurring in the storage unit and transmits information on the events to the content list manager.

19 Claims, 4 Drawing Sheets

U.S. PATENT DOCUMENTS

| | | | | |
|---|---|---|---|---|
| 2005/0091286 | A1* | 4/2005 | Fineberg et al. | 707/200 |
| 2005/0174966 | A1* | 8/2005 | Lansford et al. | 370/329 |
| 2005/0216949 | A1* | 9/2005 | Candelora et al. | 725/134 |
| 2005/0249230 | A1* | 11/2005 | Bennett et al. | 370/428 |
| 2006/0026182 | A1 | 2/2006 | Takeda et al. | |
| 2006/0039398 | A1* | 2/2006 | Iwamura | 370/445 |
| 2006/0075015 | A1* | 4/2006 | Wu et al. | 709/202 |
| 2006/0106896 | A1* | 5/2006 | Carlson et al. | 707/204 |
| 2006/0117371 | A1* | 6/2006 | Margulis | 725/131 |
| 2006/0133414 | A1* | 6/2006 | Luoma et al. | 370/466 |
| 2006/0159109 | A1* | 7/2006 | Lamkin et al. | 370/401 |
| 2006/0161635 | A1* | 7/2006 | Lamkin et al. | 709/217 |
| 2006/0168656 | A1* | 7/2006 | Stirbu | 726/15 |
| 2006/0184972 | A1* | 8/2006 | Rafey et al. | 725/80 |
| 2006/0195553 | A1* | 8/2006 | Nakamura | 709/219 |
| 2006/0197745 | A1* | 9/2006 | Yokozawa | 345/158 |
| 2006/0218650 | A1* | 9/2006 | Costa-Requena et al. | 726/27 |
| 2006/0236232 | A1* | 10/2006 | Yuasa et al. | 715/517 |
| 2006/0245490 | A1* | 11/2006 | Yoshizawa et al. | 375/240.01 |
| 2006/0251059 | A1* | 11/2006 | Otsu et al. | 370/352 |
| 2006/0251455 | A1* | 11/2006 | Kim et al. | 400/62 |
| 2006/0282855 | A1* | 12/2006 | Margulis | 725/43 |
| 2007/0027929 | A1* | 2/2007 | Whelan | 707/200 |
| 2007/0058559 | A1* | 3/2007 | Xu | 370/252 |
| 2007/0097130 | A1* | 5/2007 | Margulis | 345/501 |
| 2007/0124474 | A1* | 5/2007 | Margulis | 709/226 |
| 2007/0143377 | A1* | 6/2007 | Waites | 707/205 |
| 2007/0157267 | A1* | 7/2007 | Lopez-Estrada | 725/90 |
| 2007/0162981 | A1* | 7/2007 | Morioka et al. | 726/30 |
| 2007/0168458 | A1* | 7/2007 | Costa-Requena et al. | 709/217 |
| 2007/0174467 | A1* | 7/2007 | Ballou et al. | 709/227 |
| 2007/0211734 | A1* | 9/2007 | Yang et al. | 370/401 |
| 2007/0217436 | A1* | 9/2007 | Markley et al. | 370/401 |
| 2007/0258718 | A1* | 11/2007 | Furlong et al. | 398/106 |
| 2007/0260652 | A1* | 11/2007 | Kaarela et al. | 707/205 |
| 2009/0033806 | A1* | 2/2009 | Yuasa | 348/734 |
| 2009/0041430 | A1* | 2/2009 | Ishizaka et al. | 386/112 |
| 2009/0055557 | A1* | 2/2009 | Namai et al. | 710/14 |
| 2009/0123131 | A1* | 5/2009 | Morioka | 386/124 |

FOREIGN PATENT DOCUMENTS

| | | |
|---|---|---|
| KR | 2007-38697 | 4/2007 |
| KR | 2007-61125 | 6/2007 |

* cited by examiner

CONTENT MANAGEMENT SYSTEM AND METHOD FOR PORTABLE DEVICE

CLAIM OF PRIORITY

This U.S. non-provisional application claims the benefit of the earlier filing date, under 35 U.S.C. §119, to that Korean Patent Application No. 2006-0044554, which was filed in the Korean Intellectual Property Office on May 18, 2006, the contents of which are incorporated herein by reference.

BACKGROUND OF THE INVENTION

1. Field of the Invention

The present invention relates to content management and, in particular, to a content management system and method for a portable device.

2. Description of the Related Art

Recent advances in wireless communications, mobile devices, streaming technologies, and compression techniques have made possible the broad distribution of multimedia content, such as digital music, image, video, and games, over the Internet. Mobile devices such as cellular phones are rapidly becoming the means to extend the range of communication and entertainment channels.

Multimedia contents are provided by Internet websites and a subscriber device, such as a personal computer (PC), personal digital assistant (PDA). In addition, a mobile device can download multimedia contents.

Typically, the downloaded multimedia content is managed in a form of a list for a user's convenience such that the device monitors newly downloaded, deleted, and/or modified multimedia content items and updates the multimedia contents list.

In order to efficiently manage a multimedia content list, the device checks the changes in the list of multimedia content periodically.

In the case of a PC operated with a high performance processor, the periodic checks on the multimedia content items are not burdensome. However, in the case of a mobile device operated under battery power, the modification checking operation is limited for the purpose of saving power. Also, the frequent modification checking operation occupies a large amount of system resource, resulting in degradation in the performance of the device.

For example, when an MPEG-1 Audio Layer 3 (MP3) player is downloading an MP3 file from a website and the modification checking period of the MP3 player is set to 5 minutes, the MP3 player cannot play or delete the MP3 file even if the MP3 file is downloaded already. Also, even when an MP3 file is deleted, the MP3 file remains in the MP3 files list, resulting in inconvenience for the user.

In the meantime, if the file checking is frequently performed, the battery life of a portable device runs short quickly and degrades multitasking performance, especially when equipped with a low capability processor.

SUMMARY OF THE INVENTION

The present invention has been made in an effort to solve the above problems and provides additional advantages, by providing a multimedia content management system and method operable on a portable device, that are capable of efficient management of multimedia content.

It is another aspect of the present invention to provide a multimedia content management system and method operable on a portable device that is capable of managing the multimedia content contained in a multimedia content list in accordance with preset monitoring conditions.

In accordance with one aspect of the present invention, the above and other objects are accomplished by a content management system. The content management system includes a storage unit which stores at least one content file, a content list manager which creates a content list of content files satisfying at least one monitoring condition and manages the content list on the basis of events occurring in the storage unit, and a monitoring unit which monitors the events occurring in the storage unit and transmits information on the events to the content list manager.

Preferably, the content list manager transmits a monitoring command having the monitoring condition to the monitoring unit, and the monitoring unit starts monitoring the events in response to the monitoring command.

Preferably, the monitoring unit includes an agent which interfaces between the content list manager and the monitoring unit so as to receive the monitoring command from the content list manager and transmits the information on the events to the content list manager and a monitoring command executer, which monitors the events, in accordance with the monitoring command received from the agent transmits a monitoring result to the agent.

Preferably, the monitoring condition includes at least one of a file extension for distinguishing types of content and a file path.

Preferably, the monitoring unit determines whether the event is an addition or deletion event of a content file of which the file extension belongs to the monitoring condition, when the monitoring condition is the file extension.

Preferably, the monitoring unit determines whether the event is an addition or deletion event of a content file of which the file path belongs to the monitoring condition, when the monitoring condition is the file path.

Preferably, the addition event stores the content file satisfying the monitoring condition into the storage unit.

Preferably, the addition event copies the content file satisfying the monitoring condition and stores the content file with different file name.

Preferably, the deletion event moves the content file satisfying the file path to another file path when the monitoring condition is the file path.

Preferably, the event includes a content identifier, a file path, and an event identifier of the content file to which the event occurs.

Preferably, the contents list manager requests detailed information on the content file to the monitoring unit on the basis of the event information and updates the contents list on the basis of the detailed information received from the monitoring unit.

In accordance with another aspect of the present invention, the above and other objects are accomplished by a content management method. The content management method includes the steps of registering at least one monitoring condition, creating a list of content files satisfying the monitoring condition, receiving an event generated when a storage status of the content file is changed, and updating the contents list on the basis of the event.

Preferably, the monitoring condition includes at least one of a file extension and a file path of the content file.

Preferably, the event includes a content identifier, a file path, and an event identifier of the content file to which occurs.

Preferably, the step of receiving the event includes the steps of transferring a monitoring command including the monitoring condition, and receiving the event in response to the monitoring occurrence information.

Preferably, the step of receiving the event includes the steps of determining whether the event is an addition or deletion event of a content file of which the file extension belongs to the monitoring condition, when the monitoring condition is the file extension.

Preferably, the step of receiving an event includes the step of determining whether the event is an addition or deletion event of a content file of which the file path belongs to the monitoring condition, when the monitoring condition is the file path.

Preferably, the addition event stores the content file satisfying the monitoring condition into a storage unit.

Preferably, the addition event copies the content file satisfying the monitoring condition and store with different file name.

Preferably, the deletion event moves the content file satisfying the file path to another file path when the monitoring condition is the file path.

Preferably, the event includes a content identifier, a file path, and an event identifier of the content file to which the event occurs.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Figure 1:
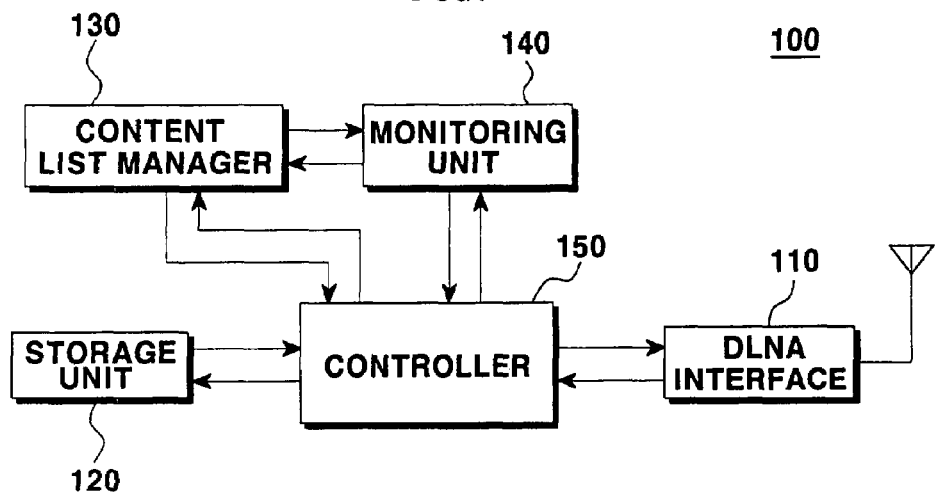
FIG. 1 is a block diagram illustrating a configuration of a content management system of a portable device according to an embodiment of the present invention.

FIG. 1 is a block diagram illustrating a configuration of content management system operating on a portable device according to an embodiment of the present invention.

In this embodiment, the content management system is implemented with a digital living network alliance (DLNA) network.

Referring to FIG. 1, a content management system 100 includes a DLNA interface 110, a storage unit 120, a content list manager 130, a monitoring unit 140, and a controller 150. The storage unit 120 and the monitoring unit 140 can be designed as an integrated single element.

The DLNA interface 110 interconnects the content management system 100 with a DLNA network (Not shown) so as to share and exchange content items with other devices connected to the DLNA network.

The storage unit 120 stores content items created by a user or received from other devices on the DLNA network. In addition, the storage unit 120 enables receiving of multimedia content items from other external devices such as MP3 players, universal serial bus (USB) memory sticks, and the like, through a communication port such as a USB port.

The content list manager 130 is responsible for managing a list of multimedia content stored in the storage unit 120. Particularly, the content list manager 130 creates a multimedia content list in consideration of at least one preset monitoring condition. The monitoring condition includes at least one of a file extension and a file path of a multimedia content file. The monitoring conditions are set by the monitoring unit 140 in accordance with user's instructions or by a manufacturer's default configuration.

The content list manager 130 transmits a monitoring command which includes the monitoring conditions to the monitoring unit 140.

In addition, the content list manager 130 performs monitoring on events occurring associated with the multimedia content files stored in the storage unit 120 and manages the multimedia content files on the basis of the events. The events are described in detail with reference to FIG. 3.

The content list manager 130 requests detailed information on a content file to the monitoring unit 140 upon receiving an event signal generated by the monitoring unit 140, and updates the multimedia content list on the basis of the detailed information of the content file.

The detailed information includes a name, a title (which can be identical with the name), a file path in a file system, and a format of the file.

In more detail, the content management system 100 checks a type of the file (i.e. an image, audio, or video) on the basis of the file extension contained in the detailed information. For example, if a multimedia content file has an extension '.mp4', the content management system determines the basic type of the multimedia content file as being a video type. After determination of the basic type of the multimedia, the content management system 100 reads a header of the multimedia content file so as to check the genuine file format. If it is determined that the multimedia content file is genuine mp4, the content management system 100 determines that the file format is supported.

The monitoring unit 140 monitors the multimedia content files stored in the storage unit 120 and transmits an event signal if an event occurs with regard to any of the multimedia content files in the storage unit 120. That is, the monitoring unit 140 receives a monitoring command including the monitoring conditions from the content list manager 130 and starts monitoring the multimedia content files stored in the storage unit 120 in response to the monitoring command.

For example, in the case that the file extension is set as the monitoring condition, the monitoring unit 140 monitors whether an addition or deletion event of a file having the identical file extension occurs. If the file path is set as one of the monitoring conditions, the monitoring unit 140 monitors whether an addition or deletion event of a file stored at an address defined by the file path occurs. Once the event is monitored, the monitoring unit 140 generates a signal corresponding to the event and transmits the event signal to the contents list manager 130.

Here, the content management system 100 stores the multimedia content file satisfying the monitoring condition into the storage unit 120 according to the file addition event. The content management system 100 also copies the multimedia content file satisfying the monitoring condition and stores the copied file as another title into the storage unit 120.

In the case of a deletion event occurring under the monitoring condition of the file path, the content management system 100 moves the content file satisfying the monitoring condition to another place defined by other file path.

The controller 150 controls overall operation of the content management system 100. Particularly, the controller 150 controls the monitoring unit 140 to generate the event signals corresponding to the addition and deletion events and to transmit the event signal to the contents list manager 130.

Figure 2:
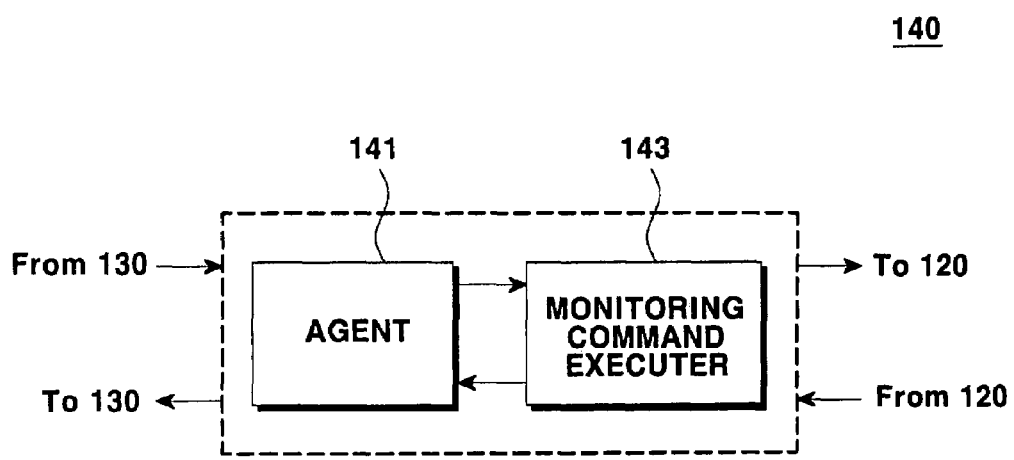
FIG. 2 is a block diagram illustrating a monitoring unit of FIG. 1.

FIG. 2 is a block diagram illustrating the monitoring unit 140 of FIG. 1.

Referring to FIG. 2, the monitoring unit 140 includes an agent 141 and a monitoring command executer 143. The agent 141 interfaces between the content list manager 130 and the monitoring unit 140. Particularly, the agent 141 enables receiving of the monitoring command from the content list manager 130 and transmitting of event occurrence message to the content list manager 130.

The monitoring command executer 143 starts monitoring upon receiving the monitoring command from the agent 141. Particularly, the monitoring command executer 143 transfers the monitoring result of the storage unit 120 to the agent 141. For example, the monitoring command executer 143 transmits event information to the agent 141 that is generated when a content file is added to or deleted from the storage unit 120.

Figure 3:
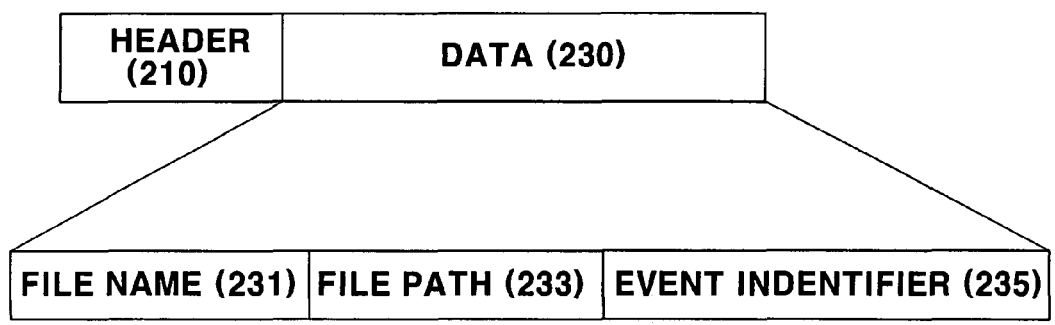
FIG. 3 illustrates a frame format of an event occurrence message according to an embodiment of the present invention.

FIG. 3 illustrates a frame format of an event occurrence message according to an embodiment of the present invention.

Referring to FIG. 3, the event occurrence message 200 includes a header field 210 and a data field 230.

The data field 230 includes a content identifier field 231 for identifying the content file, a file path field 233, and an event identifier field 235.

Preferably, the content identifier field 231 indicates a file name, the file path field 233 indicates a unique location of the content file, and the event identifier field 235 distinguishes the events. For example, event_1 indicates an addition event and event_2 indicates a deletion event.

Figure 4:
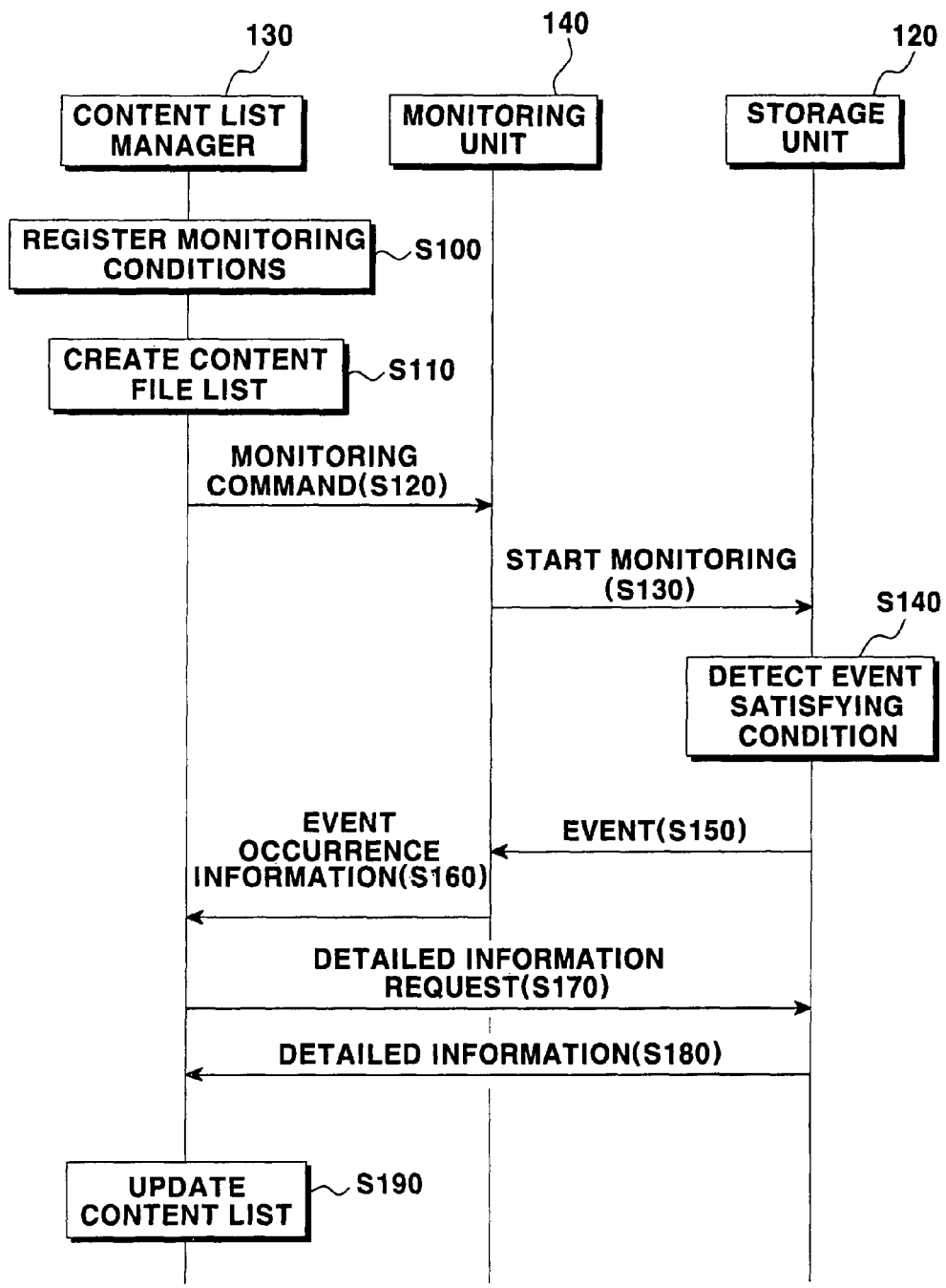
FIG. 4 is a message flow diagram illustrating a content management method according to an embodiment of the present invention.

FIG. 4 is a message flow diagram illustrating a content management method according to an embodiment of the present invention.

Referring to FIG. 1 and FIG. 4, the content list manager 130 registers at least one monitoring condition for managing the content files at step S100 and creates a content file list with the content files stored in the storage unit 120 satisfying the monitoring condition at step S110. The monitoring condition can be at least one of a file extension for distinguishing characteristics of the contents files and a file path for indicating unique location of the content files in the file system. The file condition takes effect with the operation of the monitoring unit 140.

After creation of the content file list, the content list manager 130 transmits a monitoring command, which includes the monitoring conditions, to the monitoring unit 140 at step S120. Upon receiving the monitoring command, the monitoring unit 140 starts monitoring to detect events occurring in the storage unit 120 under the monitoring conditions at step S130. The event includes a file addition and/or file deletion. That is, the agent 141 of the monitoring unit 140 requests the monitoring command executer 143 to start monitoring the status of the storage unit 120. Upon receiving the request, the monitoring command executer 143 starts monitoring the content file stored in the storage unit 120 under the monitoring conditions.

The agent 141 receives the monitoring command including the monitoring conditions from the content list manager 130 and requests the monitoring command executer 143 to start monitoring the content files in the storage unit 120.

When an event satisfying the monitoring condition is detected from the storage unit 120 at step S140, the controller 150 transmits the event to the monitoring unit 140 at step S150.

The occurrence of the event satisfying the monitoring condition is described in more detail with reference to the accompanying FIG. 5.

Preferably, the controller 150 transfers the event to the monitoring unit 140 when the event satisfying the monitoring condition occurs. The event includes a content identifier, a file path, and an event identifier.

Upon receiving the event, the monitoring unit 140 forwards the event to the content list manager at step S160. The content list manager 130 requests detailed information of the content file to the monitoring unit 140 at step S170. The detailed information of the content file includes a file name, a title (which may be identical with the file name), a file path, and a file format. Upon receiving the request for the detailed information, the controller 150 controls the storage unit 120 to transmit the detailed information of the file to the content list manager 130 at step S180. The content list manager 130 updates the content list on the basis of the detailed information of the file at step S190.

Figure 5:
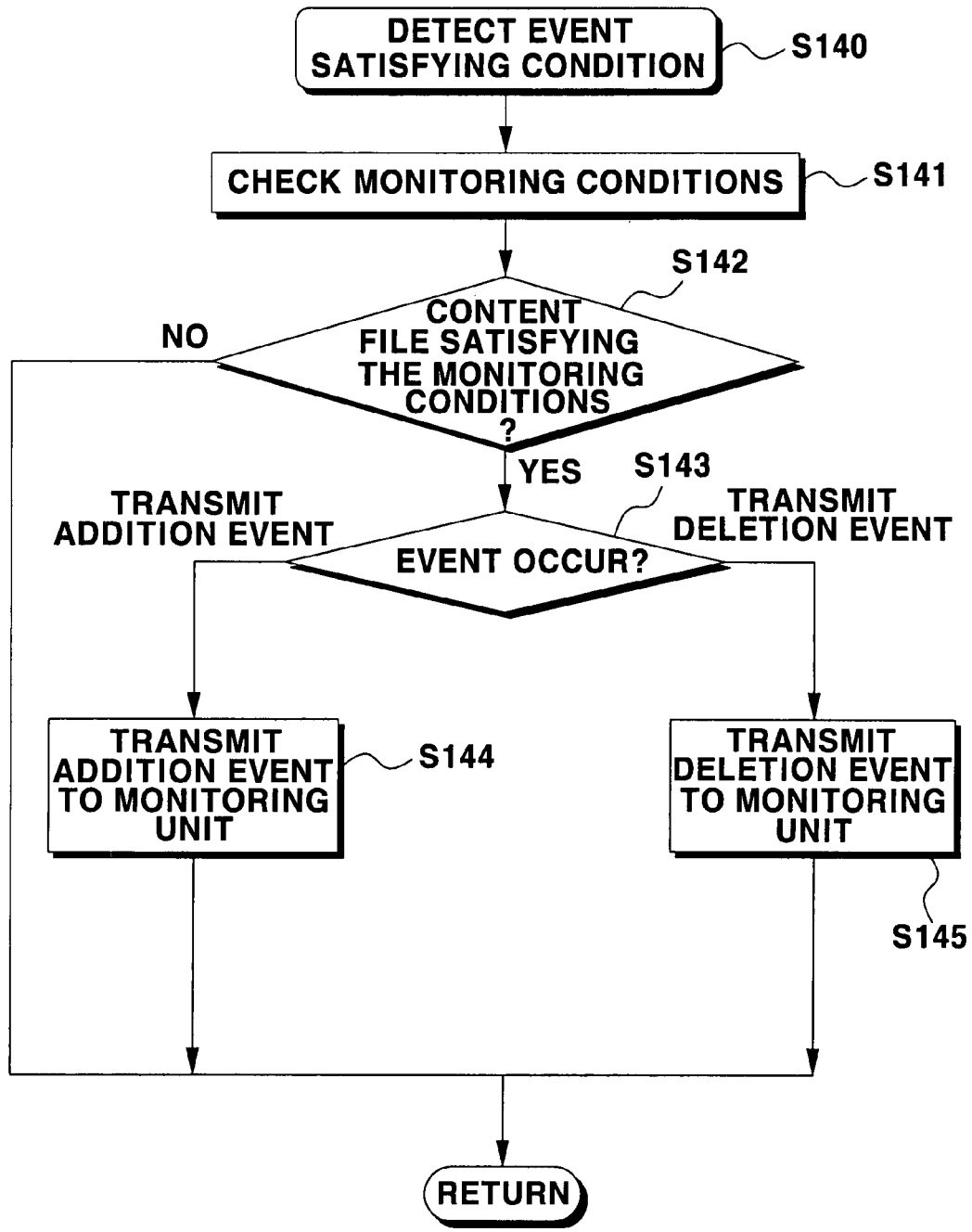
FIG. 5 is a flowchart illustrating an event processing procedure of the method of FIG. 4.

FIG. 5 is a flowchart illustrating an event processing procedure of the method of FIG. 4.

Referring to FIG. 5, the monitoring unit 140 checks the monitoring conditions at step S141 and determines whether at least one content file satisfies the monitoring condition at step S142. If the content file satisfies the monitoring condition, the monitoring unit 140 determines which event is to be applied to the content file at step S143.

If a content addition event occurs, the controller 150 transmits the content addition event information to the monitoring unit 140 at step S144. At this time, the controller 150 stores the content file satisfying the monitoring condition into the storage unit 120 or saves the content file with another title.

If a content deletion event occurs, the controller 150 controls the storage unit 120 to transmit the content deletion event information to the monitoring unit 140 at step S145. In case that the monitoring condition is the file path, the content file satisfying the monitoring condition is preferably moved to another file path.

If, at step S141, the monitoring condition is the file path, the above procedure is performed under the file extension monitoring condition.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, since the multimedia content management system of the present invention allows the file system to manage the changes of the contents files, it is possible to reduce the processing overhead of the central processing unit.

The above-described method according to the present invention can be realized as software and can be stored in a recording medium such as a CD ROM, an RAM, a floppy disk, a hard disk or a magneto-optical disk, so that a user can read such software by using a computer. Or the software may be downloaded over a network. When the software is downloaded into a memory accessible by a processor or computer chip, the processor or computer chip operates as an apparatus to execute the processing steps illustrated herein.

In addition, since the multimedia content management system of the present invention monitors the changes of the content files under monitoring conditions set by a user, it is possible to reduce the number of monitoring operations, resulting in improvement of battery life and CPU performance.

What is claimed is:

1. A content management system having a processor, comprising:
a digital living network alliance (DLNA) interface for transmitting and receiving multimedia content;
a storage unit which stores at least one content file comprising multimedia content received through the DLNA interface; and
a monitoring unit which monitors the at least one content file stored in the storage unit based on a monitoring condition, generates an event signal corresponding to a particular event if an event occurs with regard to any of the content file stored in the storage unit and transmits the event signal to a content list manager,
wherein the content list manager creates a content list of content files satisfying at least one monitoring condition in the content file stored in the storage unit and updates the content list on the basis of the event when the event signal is received from the monitoring unit, and
wherein the monitoring unit permits reconfiguration by a user of a default setting of said at least one monitoring condition in the content file of a device having the content list, and wherein an addition event copies the content file satisfying the monitoring condition and further stores the content file with a different file name.

2. The content management system of claim 1, wherein the content list manager transmits a monitoring command having the monitoring condition to the monitoring unit, and the monitoring unit starts monitoring the events in response to the monitoring command.

3. The content management system of claim 2, wherein the monitoring unit includes:
an agent, which interfaces between the content list manager and the monitoring unit, to receive the monitoring command from the content list manager and transmit the information on the events to the content list manager; and
a monitoring command executer which monitors the events in accordance with the monitoring command received from the agent and transmits a monitoring result to the agent.

4. The content management system of claim 2, wherein the monitoring condition includes at least one of a file extension for distinguishing types of contents and a file path.

5. The content management system of claim 4, wherein the monitoring unit determines whether the event is the addition event or a deletion event of a content file of which file extension belongs to the monitoring condition, when the monitoring condition is the file extension.

6. The content management system of claim 4, wherein the monitoring unit determines whether the event is an addition or deletion event of a content file of which file path belongs to the monitoring condition, when the monitoring condition is the file path.

7. The content management system of claim 6, wherein the addition event stores the content file satisfying the monitoring condition into the storage unit.

8. The content management system of claim 6, wherein the deletion event moves the content file satisfying the file path to another file path.

9. The content management system of claim 1, wherein the event includes a content identifier, a file path, and an event identifier of the content file to which the event occurs.

10. The content management system of claim 9, wherein the contents list manager requests detailed information on the content file to the monitoring unit on the basis of the event and updates the content list on the basis of the detailed information received from the monitoring unit.

11. A content management method comprising the steps of:
storing at least one content file comprising multimedia content received through a digital living network alliance (DLNA) interface into a storage unit;
registering at least one monitoring condition for monitoring by a monitoring unit of the at least one content file;
creating a content list of content files satisfying the monitoring condition in the at least one content file stored in the storage unit;
monitoring the at least one content file stored in the storage unit based on the monitoring condition;
receiving generating an event signal if an event occurs corresponding to status change with regard to any of the at least one content file stored in the storage unit, wherein the event signal corresponds to a particular event and is transmitted upon a change being recognized; and
updating the content list on the basis of the event;
wherein the monitoring unit permits reconfiguration by a user of a default setting of said at least one monitoring condition in the content file of a device having the content list, and wherein an addition event copies the content file satisfying the monitoring condition and further stores the content file with a different file name.

12. The content management method of claim 11, wherein the monitoring condition includes at least one of a file extension and a file path of the content file.

13. The content management method of claim 11, wherein the event includes a content identifier, a file path, and an event identifier of the content file to which the event occurs.

14. The content management method of claim 11, wherein the step of receiving the event further comprises the steps of:
transferring a monitoring command including the monitoring condition; and
receiving the event in response to the monitoring occurrence information.

15. The content management method of claim 14, wherein the step of receiving event further comprises the step of:
determining whether the event is the addition event or a deletion event of a content file of which file extension belongs to the monitoring condition, when the monitoring condition is the file extension.

16. The content management method of claim 14, wherein the step of receiving the event comprises the step of:
determining whether the event is an addition or deletion event of a content file of which file path belongs to the monitoring condition, when the monitoring condition is the file path.

17. The content management method of claim 16, wherein the addition event stores the content file satisfying the monitoring condition into the storage unit.

18. The content management method of claim 16, wherein the deletion event moves the content file satisfying the file path to another file path.

19. The content management method of claim 11, wherein the step of updating the content list further comprises the steps of:
updating the content list according to detailed information on the content file on the basis of the event.

* * * * *